(12) United States Patent
Casazza et al.

(10) Patent No.: US 8,937,398 B2
(45) Date of Patent: Jan. 20, 2015

(54) WIND TURBINE ROTARY ELECTRIC MACHINE

(75) Inventors: Matteo Casazza, Val di Vizze (IT); Georg Folie, Wiesen (Pfitsch)/Prati (IT)

(73) Assignee: Wilic S.ar.l., Luxembourg (LU)

( * ) Notice: Subject to any disclaimer, the term of this patent is extended or adjusted under 35 U.S.C. 154(b) by 290 days.

(21) Appl. No.: 13/415,576

(22) Filed: Mar. 8, 2012

(65) Prior Publication Data

US 2012/0248780 A1    Oct. 4, 2012

(30) Foreign Application Priority Data

Mar. 10, 2011  (IT) .............................. MI2011A0377

(51) Int. Cl.

| F03D 9/00 | (2006.01) |
|---|---|
| H02P 9/04 | (2006.01) |
| H02K 1/27 | (2006.01) |
| H02K 9/20 | (2006.01) |
| H02K 9/22 | (2006.01) |
| H02K 21/12 | (2006.01) |
| H02K 1/22 | (2006.01) |
| H02K 1/32 | (2006.01) |
| H02K 5/20 | (2006.01) |
| H02K 7/18 | (2006.01) |

(52) U.S. Cl.
CPC .............. *H02K 1/2773* (2013.01); *F03D 9/002* (2013.01); *H02K 9/20* (2013.01); *H02K 9/22* (2013.01); *F05B 2220/7066* (2013.01); *H02K 1/32* (2013.01); *H02K 5/20* (2013.01); *H02K 7/1838* (2013.01); *Y02E 10/725* (2013.01)
USPC ........... 290/55; 290/44; 310/156.53; 310/266

(58) Field of Classification Search
USPC ................................ 290/55; 310/156.53, 266
See application file for complete search history.

(56) References Cited

U.S. PATENT DOCUMENTS

| 1,894,357 A | 1/1933 | Manikowske et al. |
|---|---|---|
| 1,948,854 A | 2/1934 | Heath |
| 1,979,813 A | 11/1934 | Reis |
| 2,006,172 A | 6/1935 | Klappauf |
| 2,040,218 A | 5/1936 | Soderberg |
| 2,177,801 A | 10/1939 | Erren |
| 2,469,734 A | 5/1949 | Ledwith |

(Continued)

FOREIGN PATENT DOCUMENTS

| CA | 2404939 | 4/2004 |
|---|---|---|
| CA | 2518742 | 9/2004 |

(Continued)

OTHER PUBLICATIONS

Maxime R. Dubous, Henk Polinder, Study of TFPM Machines with Toothed Rotor Applied to Direct-Drive Generators for Wind Turbines, 2004.

(Continued)

*Primary Examiner* — Pedro J Cuevas
(74) *Attorney, Agent, or Firm* — Neal, Gerber & Eisenberg LLP

(57) ABSTRACT

A wind turbine rotary electric machine having a rotor, which rotates about a designated axis and has a rotary body; a plurality of permanent magnets fitted to the rotary body; a plurality of cooling channels close to the permanent magnets; and a plurality of heat-conducting bodies, each located partly contacting at least one permanent magnet and partly inside a cooling channel.

22 Claims, 4 Drawing Sheets

(56) References Cited

U.S. PATENT DOCUMENTS

| | | | |
|---|---|---|---|
| 2,496,897 A | 2/1950 | Strickland | |
| 2,655,611 A | 10/1953 | Sherman | |
| 2,739,253 A * | 3/1956 | Plumb | 310/156.77 |
| 2,806,160 A | 9/1957 | Brainard | |
| 2,842,214 A | 7/1958 | Prewitt | |
| 2,903,610 A | 9/1959 | Bessiere | |
| 3,004,782 A | 10/1961 | Meermans | |
| 3,072,813 A | 1/1963 | Reijnst et al. | |
| 3,083,311 A | 3/1963 | Krasnow | |
| 3,131,942 A | 5/1964 | Ertaud | |
| 3,168,686 A | 2/1965 | King et al. | |
| 3,221,195 A | 11/1965 | Hoffmann | |
| 3,363,910 A | 1/1968 | Toronchuk | |
| 3,364,523 A | 1/1968 | Schippers | |
| 3,392,910 A | 7/1968 | Tanzberger | |
| 3,468,548 A | 9/1969 | Webb | |
| 3,700,247 A | 10/1972 | Butler et al. | |
| 3,724,861 A | 4/1973 | Lesiecki | |
| 3,746,349 A | 7/1973 | Smale et al. | |
| 3,748,089 A | 7/1973 | Boyer et al. | |
| 3,789,252 A | 1/1974 | Abegg | |
| 3,841,643 A | 10/1974 | McLean | |
| 3,860,843 A | 1/1975 | Kawasaki et al. | |
| 3,942,026 A | 3/1976 | Carter | |
| 3,963,247 A | 6/1976 | Nommensen | |
| 3,968,969 A | 7/1976 | Mayer et al. | |
| 4,022,479 A | 5/1977 | Orlowski | |
| 4,061,926 A | 12/1977 | Peed | |
| 4,087,698 A | 5/1978 | Myers | |
| 4,273,343 A | 6/1981 | Visser | |
| 4,289,970 A | 9/1981 | Deibert | |
| 4,291,235 A | 9/1981 | Bergey, Jr. et al. | |
| 4,292,532 A | 9/1981 | Leroux | |
| 4,336,649 A | 6/1982 | Glaser | |
| 4,339,874 A | 7/1982 | Mc 'Carty et al. | |
| 4,348,604 A | 9/1982 | Thode | |
| 4,350,897 A | 9/1982 | Benoit | |
| 4,354,126 A | 10/1982 | Yates | |
| 4,368,895 A | 1/1983 | Okamoto et al. | |
| 4,398,773 A | 8/1983 | Boden et al. | |
| 4,452,046 A | 6/1984 | Valentin | |
| 4,482,831 A | 11/1984 | Notaras et al. | |
| 4,490,093 A | 12/1984 | Chertok et al. | |
| 4,517,483 A | 5/1985 | Hucker et al. | |
| 4,517,484 A | 5/1985 | Dacier | |
| 4,521,026 A | 6/1985 | Eide | |
| 4,585,950 A | 4/1986 | Lund | |
| 4,613,779 A | 9/1986 | Meyer | |
| 4,638,200 A | 1/1987 | Le Corre et al. | |
| 4,648,801 A | 3/1987 | Wilson | |
| 4,694,654 A | 9/1987 | Kawamura | |
| 4,700,096 A | 10/1987 | Epars | |
| 4,714,852 A | 12/1987 | Kawada et al. | |
| 4,720,640 A | 1/1988 | Anderson et al. | |
| 4,722,661 A | 2/1988 | Mizuno | |
| 4,724,348 A | 2/1988 | Stokes | |
| 4,761,590 A | 8/1988 | Kaszman | |
| 4,792,712 A | 12/1988 | Stokes | |
| 4,801,244 A | 1/1989 | Stahl | |
| 4,866,321 A | 9/1989 | Blanchard et al. | |
| 4,900,965 A | 2/1990 | Fisher | |
| 4,906,060 A | 3/1990 | Claude | |
| 4,973,868 A | 11/1990 | Wust | |
| 4,976,587 A | 12/1990 | Johnston et al. | |
| 5,004,944 A | 4/1991 | Fisher | |
| 5,063,318 A | 11/1991 | Anderson | |
| 5,090,711 A | 2/1992 | Becker | |
| 5,091,668 A | 2/1992 | Cuenot et al. | |
| 5,177,388 A | 1/1993 | Hotta et al. | |
| 5,191,255 A | 3/1993 | Kloosterhouse et al. | |
| 5,275,139 A | 1/1994 | Rosenquist | |
| 5,280,209 A | 1/1994 | Leupold et al. | |
| 5,281,094 A | 1/1994 | McCarty et al. | |
| 5,298,827 A | 3/1994 | Sugiyama | |
| 5,302,876 A | 4/1994 | Iwamatsu et al. | |
| 5,311,092 A | 5/1994 | Fisher | |
| 5,315,159 A | 5/1994 | Gribnau | |
| 5,331,238 A | 7/1994 | Johnsen | |
| 5,410,997 A | 5/1995 | Rosenquist | |
| 5,419,683 A | 5/1995 | Peace | |
| 5,456,579 A | 10/1995 | Olson | |
| 5,483,116 A | 1/1996 | Kusase et al. | |
| 5,506,453 A | 4/1996 | McCombs | |
| 5,579,800 A | 12/1996 | Walker | |
| 5,609,184 A | 3/1997 | Apel et al. | |
| 5,663,600 A | 9/1997 | Baek et al. | |
| 5,670,838 A | 9/1997 | Everton | |
| 5,696,419 A | 12/1997 | Rakestraw et al. | |
| 5,704,567 A | 1/1998 | Maglieri | |
| 5,746,576 A | 5/1998 | Bayly | |
| 5,777,952 A | 7/1998 | Nishimura et al. | |
| 5,783,894 A | 7/1998 | Wither | |
| 5,793,144 A | 8/1998 | Kusase et al. | |
| 5,798,632 A | 8/1998 | Muljadi | |
| 5,801,470 A | 9/1998 | Johnson et al. | |
| 5,811,908 A | 9/1998 | Iwata et al. | |
| 5,814,914 A | 9/1998 | Caamaño | |
| 5,844,333 A | 12/1998 | Sheerin | |
| 5,844,341 A | 12/1998 | Spooner et al. | |
| 5,857,762 A | 1/1999 | Schwaller | |
| 5,886,441 A | 3/1999 | Uchida et al. | |
| 5,889,346 A | 3/1999 | Uchida et al. | |
| 5,894,183 A | 4/1999 | Borchert | |
| 5,925,964 A | 7/1999 | Kusase et al. | |
| 5,952,755 A | 9/1999 | Lubas | |
| 5,961,124 A | 10/1999 | Muller | |
| 5,973,435 A | 10/1999 | Irie et al. | |
| 5,986,374 A | 11/1999 | Kawakami | |
| 5,986,378 A | 11/1999 | Caamaño | |
| 6,013,968 A | 1/2000 | Lechner et al. | |
| 6,037,692 A | 3/2000 | Miekka et al. | |
| 6,064,123 A | 5/2000 | Gislason | |
| 6,067,227 A | 5/2000 | Katsui et al. | |
| 6,089,536 A | 7/2000 | Watanabe et al. | |
| 6,093,984 A | 7/2000 | Shiga et al. | |
| 6,127,739 A | 10/2000 | Appa | |
| 6,172,429 B1 | 1/2001 | Russell | |
| 6,177,746 B1 | 1/2001 | Tupper et al. | |
| 6,193,211 B1 | 2/2001 | Watanabe et al. | |
| 6,194,799 B1 | 2/2001 | Miekka et al. | |
| 6,215,199 B1 | 4/2001 | Lysenko et al. | |
| 6,232,673 B1 | 5/2001 | Schoo et al. | |
| 6,278,197 B1 | 8/2001 | Appa | |
| 6,285,090 B1 | 9/2001 | Brutsaert et al. | |
| 6,326,711 B1 | 12/2001 | Yamaguchi et al. | |
| 6,365,994 B1 | 4/2002 | Watanabe et al. | |
| 6,373,160 B1 | 4/2002 | Schrödl | |
| 6,376,956 B1 | 4/2002 | Hosoya | |
| 6,378,839 B2 | 4/2002 | Watanabe et al. | |
| 6,384,504 B1 | 5/2002 | Elrhart et al. | |
| 6,417,578 B1 | 7/2002 | Chapman et al. | |
| 6,428,011 B1 | 8/2002 | Oskouei | |
| 6,452,287 B1 | 9/2002 | Looker | |
| 6,452,301 B1 | 9/2002 | Van Dine et al. | |
| 6,455,976 B1 | 9/2002 | Nakano | |
| 6,472,784 B2 | 10/2002 | Miekka et al. | |
| 6,474,653 B1 | 11/2002 | Hintenlang et al. | |
| 6,476,513 B1 | 11/2002 | Gueorguiev | |
| 6,483,199 B2 | 11/2002 | Umemoto et al. | |
| 6,492,743 B1 | 12/2002 | Appa | |
| 6,492,754 B1 | 12/2002 | Weiglhofer et al. | |
| 6,499,532 B1 | 12/2002 | Williams | |
| 6,504,260 B1 | 1/2003 | Debleser | |
| 6,515,390 B1 | 2/2003 | Lopatinsky et al. | |
| 6,520,737 B1 | 2/2003 | Fischer et al. | |
| 6,541,877 B2 * | 4/2003 | Kim et al. | 290/44 |
| 6,548,932 B1 | 4/2003 | Weiglhofer et al. | |
| 6,590,312 B1 | 7/2003 | Seguchi et al. | |
| 6,603,232 B2 | 8/2003 | Van Dine et al. | |
| 6,617,747 B1 | 9/2003 | Petersen | |
| 6,629,358 B2 | 10/2003 | Setiabudi et al. | |
| 6,664,692 B1 | 12/2003 | Kristoffersen | |
| 6,676,122 B1 | 1/2004 | Wobben | |
| 6,683,397 B2 | 1/2004 | Gauthier et al. | |

(56) References Cited

U.S. PATENT DOCUMENTS

| | | | |
|---|---|---|---|
| 6,700,260 B2 | 3/2004 | Hsu et al. |
| 6,700,288 B2 | 3/2004 | Smith |
| 6,707,224 B1 | 3/2004 | Petersen |
| 6,720,688 B1 | 4/2004 | Schiller |
| 6,727,624 B2 | 4/2004 | Morita et al. |
| 6,746,217 B2 | 6/2004 | Kim et al. |
| 6,759,758 B2 | 7/2004 | Martinez |
| 6,762,525 B1 | 7/2004 | Maslov et al. |
| 6,781,276 B1 | 8/2004 | Stiesdal et al. |
| 6,784,564 B1 | 8/2004 | Wobben |
| 6,794,781 B2 | 9/2004 | Razzell et al. |
| 6,828,710 B1 | 12/2004 | Gabrys |
| 6,856,042 B1 | 2/2005 | Kubota |
| 6,879,075 B2 | 4/2005 | Calfo et al. |
| 6,888,262 B2 | 5/2005 | Blakemore |
| 6,891,299 B2 | 5/2005 | Coupart et al. |
| 6,903,466 B1 | 6/2005 | Mercier et al. |
| 6,903,475 B2 | 6/2005 | Ortt et al. |
| 6,906,444 B2 | 6/2005 | Hattori et al. |
| 6,911,741 B2 | 6/2005 | Petteersen et al. |
| 6,921,243 B2 | 7/2005 | Canini et al. |
| 6,931,834 B2 | 8/2005 | Jones |
| 6,932,574 B2 | 8/2005 | Wobben |
| 6,933,645 B1 | 8/2005 | Watson |
| 6,933,646 B2 | 8/2005 | Kinoshita |
| 6,942,454 B2 | 9/2005 | Ohlmann |
| 6,945,747 B1 | 9/2005 | Miller |
| 6,949,860 B2 | 9/2005 | Hama et al. |
| 6,951,443 B1 | 10/2005 | Blakemore |
| 6,972,498 B2 | 12/2005 | Jamieson et al. |
| 6,983,529 B2 | 1/2006 | Ortt et al. |
| 6,984,908 B2 | 1/2006 | Rinholm et al. |
| 6,987,342 B2 | 1/2006 | Hans |
| 6,998,729 B1 | 2/2006 | Wobben |
| 7,004,724 B2 | 2/2006 | Pierce et al. |
| 7,008,172 B2 | 3/2006 | Selsam |
| 7,008,348 B2 | 3/2006 | LaBath |
| 7,016,006 B2 | 3/2006 | Song |
| 7,021,905 B2 | 4/2006 | Torrey et al. |
| 7,028,386 B2 | 4/2006 | Kato et al. |
| 7,033,139 B2 | 4/2006 | Wobben |
| 7,038,343 B2 | 5/2006 | Agnes et al. |
| 7,042,109 B2 | 5/2006 | Gabrys |
| 7,057,305 B2 | 6/2006 | Krüger-Gotzmann et al. |
| 7,075,192 B2 | 7/2006 | Bywaters et al. |
| 7,081,696 B2 | 7/2006 | Ritchey |
| 7,088,024 B2 | 8/2006 | Agnes et al. |
| 7,091,642 B2 | 8/2006 | Agnes et al. |
| 7,095,128 B2 | 8/2006 | Canini et al. |
| 7,098,552 B2 | 8/2006 | McCoin |
| 7,109,600 B1 | 9/2006 | Bywaters et al. |
| 7,111,668 B2 | 9/2006 | Rürup |
| 7,116,006 B2 | 10/2006 | McCoin |
| 7,119,469 B2 | 10/2006 | Ortt et al. |
| 7,154,191 B2 | 12/2006 | Jansen et al. |
| 7,161,260 B2 | 1/2007 | Krügen-Gotzmann et al. |
| 7,166,942 B2 | 1/2007 | Yokota |
| 7,168,248 B2 | 1/2007 | Sakamoto et al. |
| 7,168,251 B1 | 1/2007 | Janssen |
| 7,179,056 B2 | 2/2007 | Sieffriedsen |
| 7,180,204 B2 | 2/2007 | Grant et al. |
| 7,183,665 B2 | 2/2007 | Bywaters et al. |
| 7,196,446 B2 | 3/2007 | Hans |
| 7,205,678 B2 | 4/2007 | Casazza et al. |
| 7,217,091 B2 | 5/2007 | LeMieux |
| 7,259,472 B2 | 8/2007 | Miyake et al. |
| 7,281,501 B2 | 10/2007 | Leufen et al. |
| 7,285,890 B2 | 10/2007 | Jones et al. |
| 7,323,792 B2 | 1/2008 | Sohn |
| 7,345,376 B2 | 3/2008 | Costin |
| 7,358,637 B2 | 4/2008 | Tapper |
| 7,377,163 B2 | 5/2008 | Miyagawa |
| 7,385,305 B2 | 6/2008 | Casazza et al. |
| 7,385,306 B2 | 6/2008 | Casazza et al. |
| 7,392,988 B2 | 7/2008 | Moldt et al. |
| 7,427,814 B2 | 9/2008 | Bagepalli et al. |
| 7,431,567 B1 | 10/2008 | Bevington et al. |
| 7,443,066 B2 | 10/2008 | Salamah et al. |
| 7,458,261 B2 | 12/2008 | Miyagawa |
| 7,482,720 B2 | 1/2009 | Gordon et al. |
| 7,548,008 B2 | 6/2009 | Jansen et al. |
| 7,550,863 B2 | 6/2009 | Versteegh |
| 7,594,800 B2 | 9/2009 | Teipen |
| 7,619,332 B2 * | 11/2009 | Kimura et al. ............ 310/58 |
| 7,687,932 B2 | 3/2010 | Casazza et al. |
| 7,888,839 B2 * | 2/2011 | Gabrys et al. ............ 310/266 |
| 7,936,102 B2 * | 5/2011 | Pabst et al. ............ 310/156.12 |
| 7,946,591 B2 * | 5/2011 | Pabst et al. ............ 277/417 |
| 8,310,122 B2 * | 11/2012 | Pabst et al. ............ 310/156.18 |
| 2002/0047418 A1 | 4/2002 | Seguchi et al. |
| 2002/0047425 A1 | 4/2002 | Coupart et al. |
| 2002/0056822 A1 | 5/2002 | Watanabe et al. |
| 2002/0063485 A1 | 5/2002 | Lee et al. |
| 2002/0089251 A1 | 7/2002 | Tajima et al. |
| 2002/0117926 A1 * | 8/2002 | Joong et al. ............ 310/191 |
| 2002/0148453 A1 | 10/2002 | Watanabe et al. |
| 2003/0011266 A1 | 1/2003 | Morita et al. |
| 2003/0102677 A1 | 6/2003 | Becker et al. |
| 2003/0137149 A1 | 7/2003 | Northrup et al. |
| 2003/0230899 A1 | 12/2003 | Martinez |
| 2004/0066098 A1 | 4/2004 | Doherty et al. |
| 2004/0086373 A1 | 5/2004 | Page, Jr. |
| 2004/0094965 A1 | 5/2004 | Kirkegaard et al. |
| 2004/0119292 A1 | 6/2004 | Datta et al. |
| 2004/0150283 A1 | 8/2004 | Calfo et al. |
| 2004/0151575 A1 | 8/2004 | Pierce et al. |
| 2004/0151577 A1 | 8/2004 | Pierce et al. |
| 2004/0189136 A1 | 9/2004 | Kolomeitsev et al. |
| 2005/0002783 A1 | 1/2005 | Hiel et al. |
| 2005/0002787 A1 | 1/2005 | Wobben |
| 2005/0082836 A1 | 4/2005 | Lagerwey |
| 2005/0082839 A1 | 4/2005 | McCoin |
| 2005/0230979 A1 | 10/2005 | Bywaters et al. |
| 2005/0280264 A1 | 12/2005 | Nagy |
| 2006/0000269 A1 | 1/2006 | LeMieux et al. |
| 2006/0001269 A1 | 1/2006 | Jansen et al. |
| 2006/0006658 A1 | 1/2006 | McCoin |
| 2006/0012182 A1 | 1/2006 | McCoin |
| 2006/0028025 A1 | 2/2006 | Kikuchi et al. |
| 2006/0033402 A1 * | 2/2006 | Kim et al. ............ 310/261 |
| 2006/0038450 A1 | 2/2006 | Matin et al. |
| 2006/0066110 A1 | 3/2006 | Jansen et al. |
| 2006/0071575 A1 | 4/2006 | Jansen et al. |
| 2006/0091735 A1 | 5/2006 | Song et al. |
| 2006/0125243 A1 | 6/2006 | Miller |
| 2006/0131985 A1 | 6/2006 | Qu et al. |
| 2006/0152012 A1 | 7/2006 | Wiegel et al. |
| 2006/0152015 A1 | 7/2006 | Bywaters et al. |
| 2006/0152016 A1 | 7/2006 | Bywaters et al. |
| 2007/0020109 A1 | 1/2007 | Takahashi et al. |
| 2007/0024132 A1 | 2/2007 | Salamah et al. |
| 2007/0116567 A1 | 5/2007 | Luetze |
| 2007/0187954 A1 | 8/2007 | Struve et al. |
| 2007/0187956 A1 | 8/2007 | Wobben |
| 2007/0222223 A1 | 9/2007 | Bagepalli et al. |
| 2007/0222226 A1 | 9/2007 | Casazza et al. |
| 2007/0222227 A1 | 9/2007 | Casazza et al. |
| 2008/0003105 A1 | 1/2008 | Nies |
| 2008/0025847 A1 | 1/2008 | Teipen |
| 2008/0050234 A1 | 2/2008 | Ingersoll et al. |
| 2008/0107526 A1 | 5/2008 | Wobben |
| 2008/0118342 A1 | 5/2008 | Seidel et al. |
| 2008/0197636 A1 | 8/2008 | Tilscher et al. |
| 2008/0197638 A1 | 8/2008 | Wobben |
| 2008/0246224 A1 | 10/2008 | Pabst et al. |
| 2008/0290664 A1 | 11/2008 | Kruger |
| 2008/0303281 A1 | 12/2008 | Krueger |
| 2008/0309189 A1 | 12/2008 | Pabst et al. |
| 2008/0315594 A1 | 12/2008 | Casazza et al. |
| 2009/0045628 A1 | 2/2009 | Erdman et al. |
| 2009/0060748 A1 | 3/2009 | Landa et al. |
| 2009/0094981 A1 | 4/2009 | Eggleston |
| 2009/0096309 A1 | 4/2009 | Pabst et al. |
| 2009/0302702 A1 | 12/2009 | Pabst et al. |

(56) References Cited

U.S. PATENT DOCUMENTS

| | | | |
|---|---|---|---|
| 2010/0019502 A1 | 1/2010 | Pabst et al. | |
| 2010/0026010 A1 | 2/2010 | Pabst | |
| 2010/0117362 A1 | 5/2010 | Vihriala et al. | |
| 2010/0123318 A1 | 5/2010 | Casazza et al. | |
| 2011/0241453 A1* | 10/2011 | Idland et al. | 310/43 |
| 2012/0248781 A1* | 10/2012 | Casazza et al. | 290/55 |
| 2013/0062975 A1* | 3/2013 | Pabst et al. | 310/59 |
| 2013/0270937 A1* | 10/2013 | Rasmussen | 310/54 |
| 2013/0342049 A1* | 12/2013 | Stridsberg | 310/58 |
| 2014/0028139 A1* | 1/2014 | Hamer et al. | 310/156.11 |
| 2014/0054897 A1* | 2/2014 | Casazza et al. | 290/55 |
| 2014/0062231 A1* | 3/2014 | Casazza et al. | 310/59 |

FOREIGN PATENT DOCUMENTS

| | | |
|---|---|---|
| CN | 1554867 | 12/2004 |
| DE | 1130913 | 6/1962 |
| DE | 2164135 | 7/1973 |
| DE | 2322458 | 11/1974 |
| DE | 2506160 | 8/1976 |
| DE | 2922885 | 12/1980 |
| DE | 3638129 | 5/1988 |
| DE | 3718954 | 12/1988 |
| DE | 3844505 | 7/1990 |
| DE | 3903399 | 8/1990 |
| DE | 4304577 | 8/1994 |
| DE | 4402184 | 8/1995 |
| DE | 4415570 | 11/1995 |
| DE | 4436290 | 5/1996 |
| DE | 4444757 | 6/1996 |
| DE | 4445899 | 6/1996 |
| DE | 19501267 | 8/1996 |
| DE | 29706980 | 7/1997 |
| DE | 19636591 | 3/1998 |
| DE | 19644355 | 4/1998 |
| DE | 19652673 | 6/1998 |
| DE | 19711869 | 9/1998 |
| DE | 19748716 | 11/1998 |
| DE | 29819391 | 2/1999 |
| DE | 19801803 | 4/1999 |
| DE | 19826086 | 12/1999 |
| DE | 19932394 | 1/2001 |
| DE | 19947915 | 4/2001 |
| DE | 19951594 | 5/2001 |
| DE | 10000370 | 7/2001 |
| DE | 20102029 | 8/2001 |
| DE | 10219190 | 11/2003 |
| DE | 10246690 | 4/2004 |
| DE | 102004018524 | 11/2005 |
| DE | 102004028746 | 12/2005 |
| DE | 10 2004 031329 | 1/2006 |
| DE | 102007042338 | 3/2009 |
| EP | 0013157 | 7/1980 |
| EP | 0232963 | 8/1987 |
| EP | 0313392 | 4/1989 |
| EP | 0627805 | 12/1994 |
| EP | 1108888 | 6/2001 |
| EP | 1167754 | 1/2002 |
| EP | 1289097 | 3/2003 |
| EP | 1291521 | 3/2003 |
| EP | 1425840 | 3/2003 |
| EP | 1309067 | 5/2003 |
| EP | 1363019 | 11/2003 |
| EP | 1375913 | 1/2004 |
| EP | 1394406 | 3/2004 |
| EP | 1394451 | 3/2004 |
| EP | 2063117 | 5/2005 |
| EP | 1568883 | 8/2005 |
| EP | 1589222 | 10/2005 |
| EP | 1612415 | 1/2006 |
| EP | 1641102 | 3/2006 |
| EP | 1792381 | 3/2006 |
| EP | 1677002 | 7/2006 |
| EP | 1772624 | 4/2007 |
| EP | 1780409 | 5/2007 |
| EP | 1788241 | 5/2007 |
| EP | 1829762 | 9/2007 |
| EP | 1881194 | 1/2008 |
| EP | 1921311 | 5/2008 |
| EP | 2105496 | 7/2008 |
| EP | 2060786 | 5/2009 |
| EP | 2063115 | 5/2009 |
| EP | 2063116 | 5/2009 |
| EP | 2143842 | 1/2010 |
| EP | 2143938 | 1/2010 |
| EP | 2143944 | 1/2010 |
| ES | 2140301 | 2/2000 |
| FR | 806292 | 12/1936 |
| FR | 859844 | 12/1940 |
| FR | 1348765 | 1/1964 |
| FR | 2401091 | 3/1979 |
| FR | 2445053 | 7/1980 |
| FR | 2519483 | 7/1983 |
| FR | 2594272 | 8/1987 |
| FR | 2613148 | 3/1988 |
| FR | 2760492 | 9/1998 |
| FR | 2796671 | 1/2001 |
| FR | 2798168 | 3/2001 |
| FR | 2810374 | 12/2001 |
| FR | 2882404 | 8/2006 |
| GB | 191317268 | 3/1914 |
| GB | 859176 | 1/1961 |
| GB | 1 393 025 | 5/1975 |
| GB | 1524477 | 9/1978 |
| GB | 1537729 | 1/1979 |
| GB | 2041111 | 9/1980 |
| GB | 2050525 | 1/1981 |
| GB | 2075274 | 11/1981 |
| GB | 2131630 | 6/1984 |
| GB | 2144587 | 3/1985 |
| GB | 2208243 | 3/1989 |
| GB | 2266937 | 11/1993 |
| GB | 2372783 | 9/2002 |
| JP | 56081053 | 7/1981 |
| JP | 57059462 | 4/1982 |
| JP | 3145945 | 6/1991 |
| JP | 5122912 | 5/1993 |
| JP | 6002970 | 1/1994 |
| JP | 6269141 | 9/1994 |
| JP | 8 298736 | 11/1996 |
| JP | 10-070858 | 3/1998 |
| JP | 11236977 | 8/1999 |
| JP | 11-299197 | 10/1999 |
| JP | 2000-134885 | 5/2000 |
| JP | 2001-057750 | 2/2001 |
| JP | 2004-153913 | 5/2004 |
| JP | 2004-297947 | 10/2004 |
| JP | 2005-006375 | 1/2005 |
| JP | 2005-020906 | 1/2005 |
| JP | 2005-312150 | 11/2005 |
| NL | 8902534 | 5/1991 |
| RU | 2000466 | 9/1993 |
| RU | 2229621 | 5/2004 |
| WO | WO8402382 | 6/1984 |
| WO | WO9105953 | 5/1991 |
| WO | WO9212343 | 7/1992 |
| WO | WO9607825 | 3/1996 |
| WO | WO9730504 | 8/1997 |
| WO | WO9733357 | 9/1997 |
| WO | WO9840627 | 9/1998 |
| WO | WO9930031 | 6/1999 |
| WO | WO9933165 | 7/1999 |
| WO | WO9937912 | 7/1999 |
| WO | WO9939426 | 8/1999 |
| WO | WO001056 | 1/2000 |
| WO | WO0014405 | 3/2000 |
| WO | WO0106121 | 1/2001 |
| WO | WO0106623 | 1/2001 |
| WO | WO0107784 | 2/2001 |
| WO | WO0121956 | 3/2001 |
| WO | WO0125631 | 4/2001 |
| WO | WO0129413 | 4/2001 |
| WO | WO0134973 | 5/2001 |

(56) References Cited

FOREIGN PATENT DOCUMENTS

| WO | WO0135517 | 5/2001 |
|---|---|---|
| WO | WO0169754 | 9/2001 |
| WO | WO0233254 | 4/2002 |
| WO | WO02057624 | 7/2002 |
| WO | WO02083523 | 10/2002 |
| WO | WO03036084 | 5/2003 |
| WO | WO03067081 | 8/2003 |
| WO | WO03076801 | 9/2003 |
| WO | WO2004017497 | 2/2004 |
| WO | WO2004042227 | 5/2004 |
| WO | WO2004044419 | 5/2004 |
| WO | WO2005050008 | 6/2005 |
| WO | WO2005103489 | 11/2005 |
| WO | WO2006013722 | 2/2006 |
| WO | WO2006032515 | 3/2006 |
| WO | WO2007063370 | 6/2007 |
| WO | WO2007110718 | 10/2007 |
| WO | WO2008052562 | 5/2008 |
| WO | WO2008086608 | 7/2008 |
| WO | WO2008098573 | 8/2008 |
| WO | WO2008102184 | 8/2008 |
| WO | WO2008116463 | 10/2008 |
| WO | WO2008131766 | 11/2008 |
| WO | 2009/122596 | 10/2009 |

OTHER PUBLICATIONS

Variable Speed Gearless Wind Turbine (website), http://www.mhi.cojp/msmw/mw/en/gearless.html, viewed on Sep. 22, 2006.
International Search Report for Italian Application No. MI2011A 000377 dated Jan. 30, 2012.

* cited by examiner

WIND TURBINE ROTARY ELECTRIC MACHINE

PRIORITY CLAIM

This application claims the benefit of and priority to Italian Patent Application No. MI2011A 000377, filed on Mar. 10, 2011, the entire contents of which are incorporated by reference herein.

BACKGROUND

Wind turbine rotary electric machines normally installed on wind turbines are large, and their efficiency is inversely proportional to the temperature of the permanent magnets, the magnetic strength of which decreases as temperature increases.

SUMMARY

The present disclosure relates to a wind turbine rotary electric machine.

More specifically, the present disclosure relates to an electric machine comprising a rotor, which rotates about a designated or given axis and comprises a rotary body; and a plurality of permanent magnets fitted to the rotary body.

In one embodiment, the present disclosure provides a rotary electric machine configured to effectively cool the permanent magnets.

According to one embodiment of the present disclosure, there is provided a wind turbine rotary electric machine comprising a rotor, which rotates about a designated or given axis and comprises a rotary body; a plurality of permanent magnets fitted to the rotary body; a plurality of cooling channels close to the permanent magnets; and a plurality of heat-conducting bodies, each located partly contacting at least one permanent magnet and partly inside a cooling channel.

The heat generated by the permanent magnets is thus transferred partly by conduction into a cooling channel and removed by cooling fluid. Transfer of the heat is achieved both by the proximity of the cooling channel to the permanent magnet, and by the heat-conducting body.

The heat-conducting bodies may be positioned contacting the permanent magnets in various configurations. For example, each heat-conducting body may be positioned contacting one or more permanent magnets, or contacting two axially or radially aligned permanent magnets.

The numerous heat-conducting body configurations available make the present disclosure highly versatile.

In one embodiment of the present disclosure, each permanent magnet has a seat for housing the heat-conducting body.

This characteristic provides an extensive heat-conducting body-permanent magnet contact surface, which improves heat exchange by conduction between the permanent magnet and the heat-conducting body.

In another embodiment of the present disclosure, the heat-conducting body is a heat pipe.

Heat pipes have proved particularly suitable for this type of application, by acting as heat exchangers and so transferring large amounts of heat per unit time and area.

In one embodiment, construction-wise, the heat-conducting body is made in the form of a substantially straight rod and positioned radially, which produces no appreciable load loss in the cooling channel.

Cooling fins are also conveniently provided along the part of the heat-conducting body housed inside the cooling channel. In one embodiment, the cooling fins are parallel to the designated or given axis to improve heat exchange efficiency with no appreciable increase in load loss of cooling fluid flow along the cooling channel.

In one embodiment of the present disclosure, each cooling channel extends axially between the rotary body and at least one permanent magnet.

Positioning the cooling channel close to the permanent magnet greatly enhances the effectiveness of the cooling fluid.

In one embodiment, the cooling channels include first cooling channels, each extending axially and bounded by a row of permanent magnets, by a cylindrical wall of the rotary body of the rotor, and by two clips for supporting the permanent magnets.

In this embodiment, direct contact of the cooling fluid with the row of permanent magnets provides for removing a large amount of heat.

In one embodiment, the cooling channels comprise second cooling channels, each bounded by two radially spaced rows of permanent magnets.

This configuration provides for simultaneously cooling two rows of permanent magnets.

In one embodiment, the electric machine advantageously has a segmented structure. More specifically, the rotor comprises a plurality of sectors, each extending parallel to the designated or given axis and associated with at least one cooling channel.

In this embodiment, each active sector is thus cooled independently of the other active sectors.

In one embodiment of the present disclosure, the rotor comprises a plurality of active sectors, each comprising two magnetic guides; and two radially spaced rows of permanent magnets clamped between the two magnetic guides.

This embodiment provides for also effectively cooling the magnetic guides.

In another embodiment, the present disclosure is used to advantage in direct-drive wind turbines, in which the hub supporting a plurality of blades is connected directly to the rotary electric machine rotor. In large machines of this sort, rotor cooling has an important effect on the overall efficiency of the machine; and, given the configuration of wind turbines, the rotor is often difficult to cool, especially when the rotor is located inside the stator.

Additional features and advantages are described in, and will be apparent from, the following Detailed Description and the figures.

BRIEF DESCRIPTION OF THE DRAWINGS

A number of non-limiting embodiments of the present disclosure will be described by way of example with reference to the accompanying drawings, in which.

DETAILED DESCRIPTION

Figure 1:
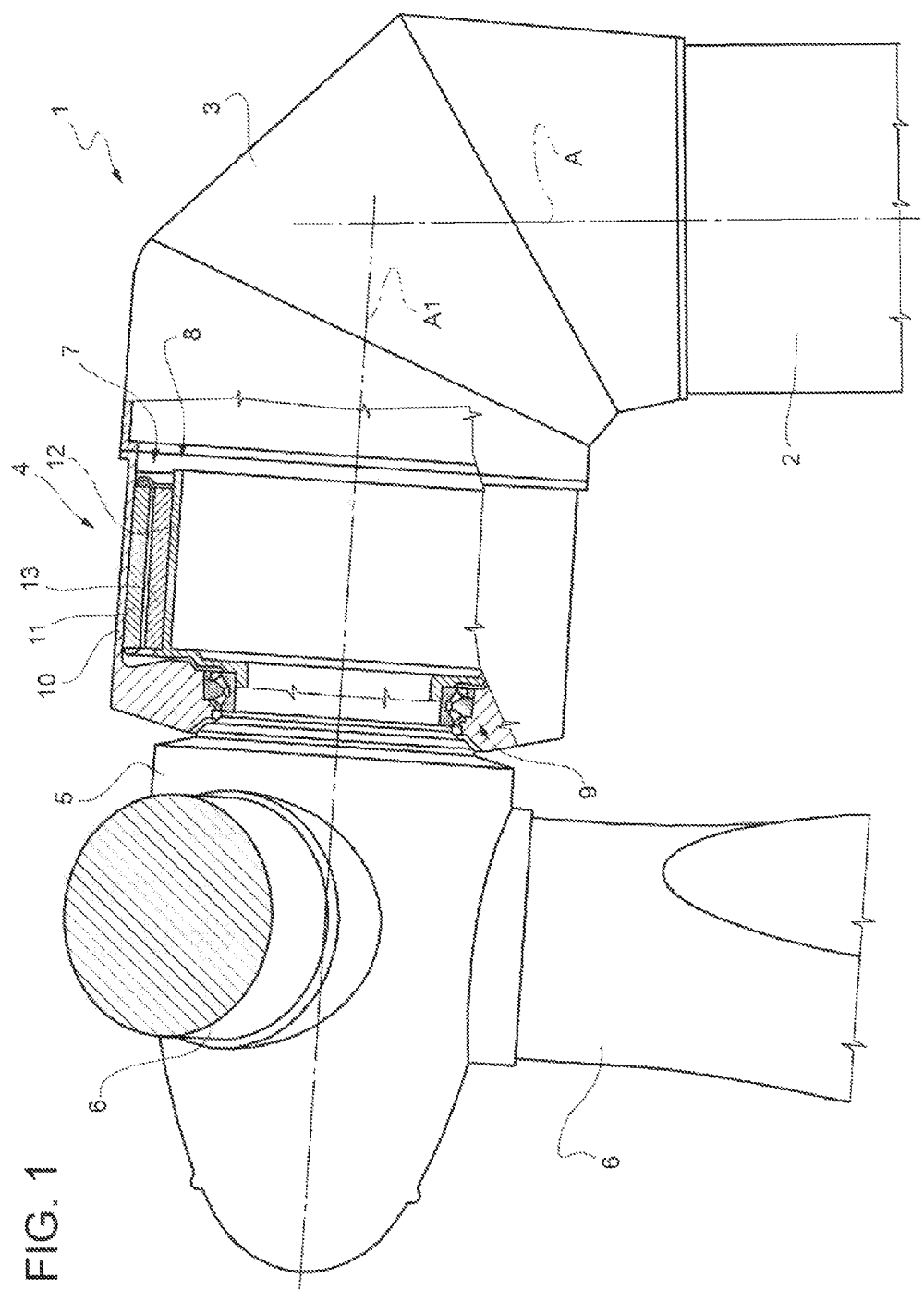
FIG. 1 shows a partly sectioned side view, with parts removed for clarity, of a wind turbine comprising a rotary electric machine in accordance with the present disclosure.

Referring now to the example embodiments of the present disclosure illustrated in FIGS. 1 to 6, number 1 in FIG. 1 indicates as a whole a wind turbine for producing electric energy. Wind turbine 1 comprises a supporting structure 2, a nacelle 3, a rotary electric machine 4, a hub 5, and three blades 6 (only two shown in FIG. 1). Nacelle 3 is mounted to rotate with respect to supporting structure 2 about an axis A, and hub 5 to rotate with respect to nacelle 3 about an axis A1. Rotary electric machine 4 comprises a stator 7 partly defining nacelle 3, or rather the outer shell of nacelle 3; and a rotor 8 connected rigidly to hub 5. And a bearing 9 is located between stator 7 and rotor 8—in the example shown, one bearing 9 located close to the connection of rotor 8 to hub 5.

Stator 7 comprises a tubular body 10, and a plurality of active stator sectors 11 arranged about axis A1 and fitted to tubular body 10; and rotor 8 comprises a rotary tubular body 12, and a plurality of active rotor sectors 13 arranged about axis A1 and fitted to tubular body 12.

In the present disclosure, tubular body 12 has the advantage of being extremely lightweight, but may be replaced with any rotary body with a face configured to support active sectors 13.

Figure 2:
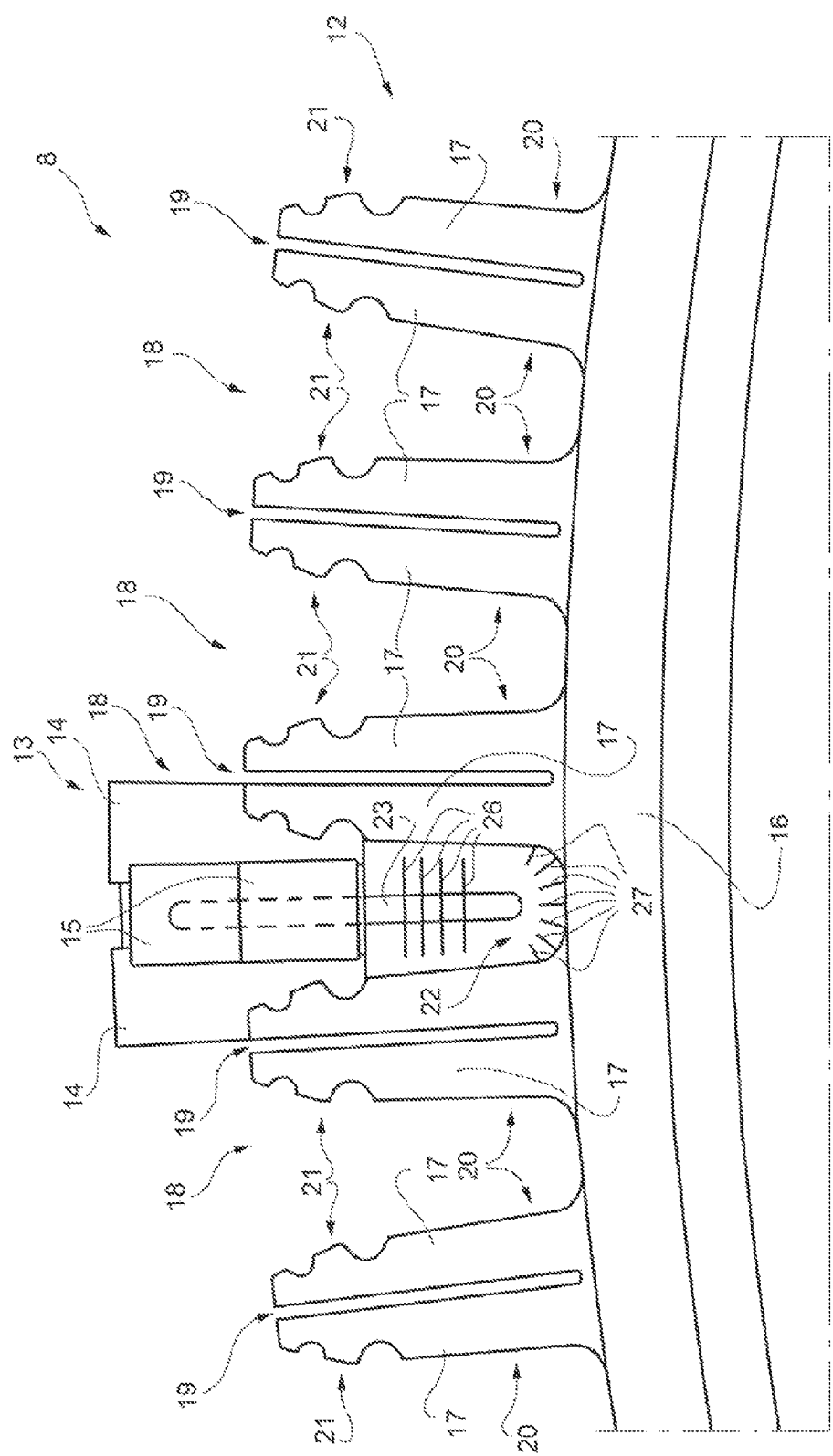
FIG. 2 shows a larger-scale front view, with parts removed for clarity, of a detail of the FIG. 1 rotary electric machine.

Active sectors 11 and 13 extend parallel to axis A1, are positioned facing and separated by an air gap, and are insertable and removable axially with respect to respective tubular bodies 10 and 12. In the example shown, rotary electric machine 4 is a synchronous, permanent-magnet type, and each active stator sector 11 is defined by a magnetic guide coupled to a coil (not shown in the drawings); and, as shown in FIG. 2, each active rotor sector 13 is defined by magnetic guides 14 coupled to permanent magnets 15. More specifically, permanent magnets 15 are arranged in two radially superimposed rows and clamped between the two magnetic guides 14.

With reference to FIG. 2, tubular body 12 comprises a cylindrical wall 16; and a plurality of clips 17 configured to define, along cylindrical wall 16, a plurality of seats 18 for housing a plurality of active sectors 13 (only one of which is shown in FIG. 2 for the sake of simplicity). Each seat 18 housing active sector 13 extends between two facing clips 17. The pairs of facing clips 17 defining respective seats 18 are equally spaced about axis A1 and separated by axial gaps 19 sized to allow clips 17 to flex circumferentially, to insert and extract active sectors 13 into and from respective seats 18, and to spring back into position to clamp active sectors 13. Clips 17 act directly on the two opposite magnetic guides 14.

Each clip 17 comprises a base portion 20 adjacent to cylindrical wall 16; and an end portion 21 configured to engage active sector 13, so as to define a channel 22 between each pair of clips 17, active sector 13, and cylindrical wall 16. In other words, active sector 13 only occupies part, and projects partly outwards, of seat 18. Channel 22 is configured to allow cooling fluid to circulate even in direct contact with a row of permanent magnets 15.

Rotor 8 comprises a plurality of heat-conducting bodies 23 (only one shown in FIG. 2 for the sake of simplicity), each positioned partly contacting at least one permanent magnet 15 and partly inserted inside a cooling channel 22.

Heat-conducting body 23 is positioned contacting one or more permanent magnets 15. In FIG. 2, part of heat-conducting body 23 is located inside two radially aligned permanent magnets 15.

Figure 3:
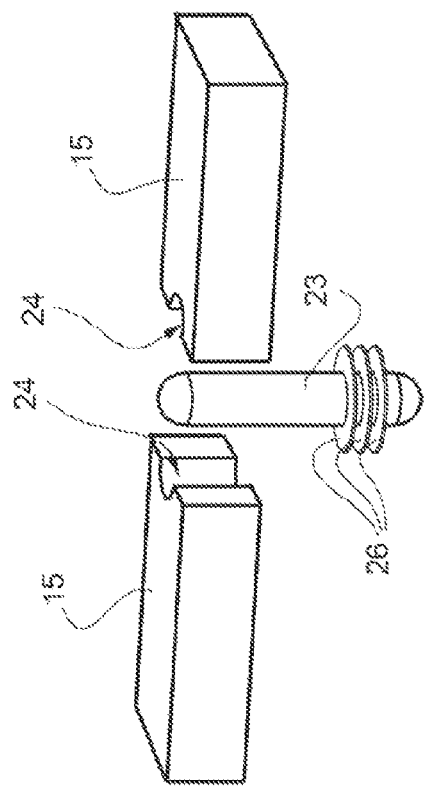
FIGS. 3, 4 and 5 show larger-scale views, in perspective, with parts removed for clarity, of respective ways in which to connect the permanent magnets and heat-conducting body.
Figure 4:
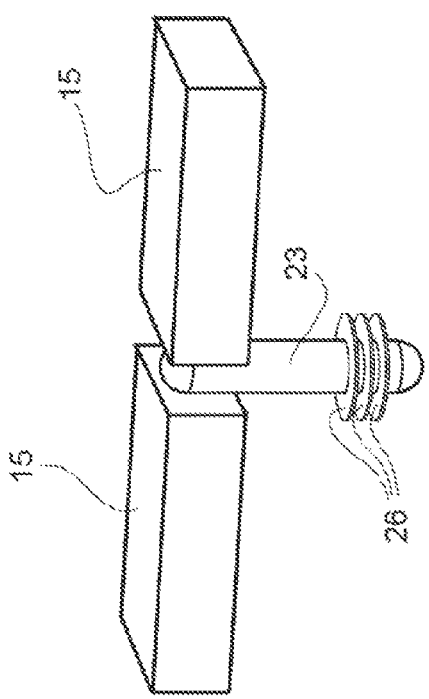
Figure 5:
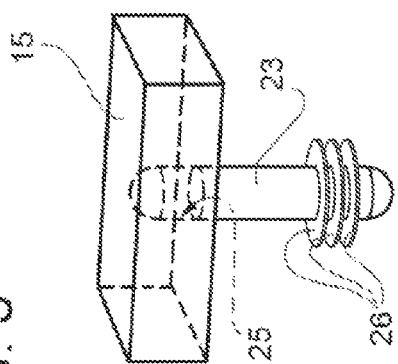

In FIGS. 3 and 4, heat-conducting body 23 is positioned between two axially aligned permanent magnets 15, and, in FIG. 5, is located partly inside one permanent magnet 15.

In FIGS. 4 and 5, permanent magnets 15 have seats for heat-conducting bodies 23. In the FIG. 4 example, each permanent magnet 15 has a groove 24 (in which case, the seat is formed by two coupled permanent magnets 15); and, in the FIG. 5 example, permanent magnet 15 has a hole 25.

In one embodiment, heat-conducting body 23 is connected to permanent magnets 15 by a shape fit to maximize the contact area between heat-conducting body 23 and permanent magnets 15; and any slack inside the seat between heat-conducting body 23 and permanent magnet 15 may be eliminated using conducting paste.

In the example shown, heat-conducting body 23 is a heat pipe. In this example, heat-conducting body 23 is substantially straight and positioned radially (as shown more clearly in FIG. 2).

In one embodiment of the present disclosure, heat-conducting body 23 has cooling fins 26 parallel to axis A1. In the example shown, cooling fins 26 are annular, are housed inside channel 22, and are integral with the part of heat-conducting body 23 inside channel 22.

In one embodiment, the walls of channel 22 also have cooling fins 27 parallel to axis A1, and which extend from cylindrical wall 16 and clips 17.

Figure 6:
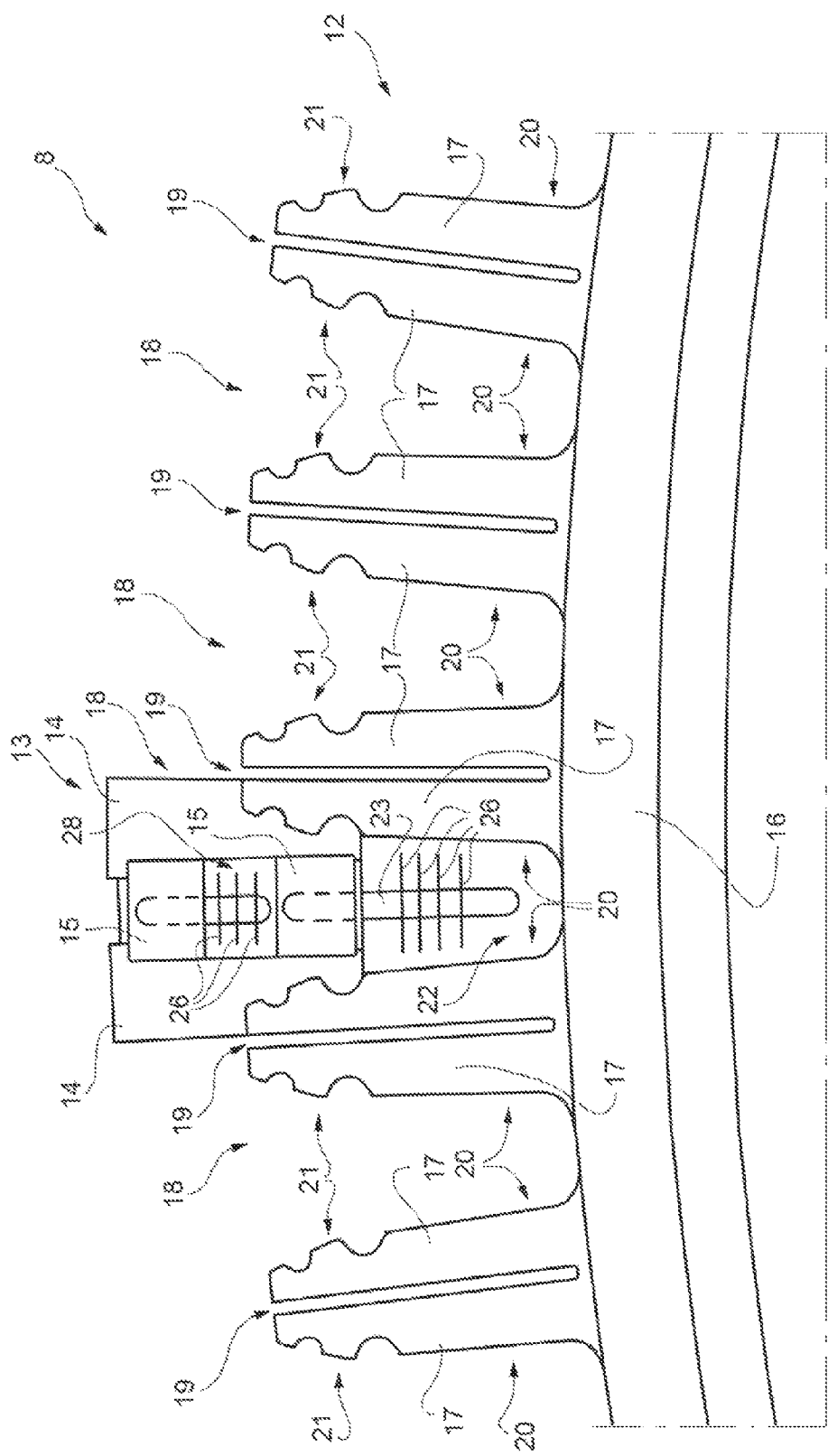
FIG. 6 shows a front view, with parts removed for clarity, of a variation of FIG. 2.

In the FIG. 6 variation, each active sector 13 comprises two radially spaced axial rows of permanent magnets 15 to define a further cooling channel 28 between the two rows of permanent magnets 15 and the two magnetic guides 14. In this case, air flows along two opposite faces of permanent magnets 15 in each row; each row of permanent magnets 15 is associated with a respective heat-conducting body 23—in the example shown, a heat pipe—positioned partly contacting permanent magnets 15 and partly inside one of cooling channels 22, 28; and heat-conducting bodies 23 are sized according to the available space, and advantageously have cooling fins along the part inside channel 22, 28.

In the example shown in the drawings, the rotary electric machine is a tubular type, with the rotor inside the stator; it being understood, however, that the present disclosure also applies to electric generators with the rotor surrounding the stator.

The present disclosure also covers embodiments not described herein and equivalent embodiments, which nevertheless fall within the protective scope of the accompanying Claims. That is, it should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A wind turbine rotary electric machine comprising:
  a rotor configured to rotate about an axis, said rotor including a rotary body;
  a plurality of permanent magnets fitted to the rotary body;
  a plurality of axially extending cooling channels, each cooling channel at least partially bounded by at least one of the permanent magnets; and
  a plurality of heat-conducting bodies, each located:
    (a) partly contacting at least one of the permanent magnets, and
    (b) partly inside one of the cooling channels.

2. The wind turbine rotary electric machine of claim 1, wherein each heat-conducting body is positioned contacting two of the permanent magnets.

3. The wind turbine rotary electric machine of claim 1, wherein two of the permanent magnets are axially aligned and at least one of the heat-conducting bodies is located between said two axially aligned permanent magnets.

4. The wind turbine rotary electric machine of claim 1, wherein two of the permanent magnets are radially aligned and at least one of the heat-conducting bodies is positioned contacting said two radially aligned permanent magnets.

5. The wind turbine rotary electric machine of claim 1, wherein each of the permanent magnets includes a seat configured to house at least one of the heat-conducting bodies.

6. The wind turbine rotary electric machine of claim 1, wherein each of the heat-conducting bodies includes a heat pipe.

7. The wind turbine rotary electric machine of claim 1, wherein at least one of the heat-conducting bodies is substantially straight and radially aligned with the rotary body.

8. The wind turbine rotary electric machine of claim 1, wherein at least one of the heat-conducting bodies includes cooling fins housed inside one of the cooling channels.

9. The wind turbine rotary electric machine of claim 1, wherein at least one of the cooling channels is bounded by:
   a row of the permanent magnets,
   a portion of a cylindrical wall of the rotary body of the rotor, and
   two clips configured to support at least one of the permanent magnets.

10. The wind turbine rotary electric machine of claim 1, wherein the plurality of cooling channels are each at least partially bounded by a plurality of radially spaced rows of the permanent magnets.

11. The wind turbine rotary electric machine of claim 1, wherein the rotor includes a plurality of active sectors, each extending parallel to the axis and each associated with at least one of the cooling channels.

12. The wind turbine rotary electric machine of claim 11, wherein each active sector includes two magnetic guides and two radially spaced rows of the permanent magnets clamped between the two magnetic guides.

13. A wind turbine comprising:
   a hub;
   a plurality of blades fitted to the hub; and
   a rotary electric machine including:
      a rotor configured to rotate about an axis, said rotor including a rotary body;
      a plurality of permanent magnets fitted to the rotary body;
      a plurality of axially extending cooling channels, each cooling channel at least partially bounded by at least one of the permanent magnets; and
      a plurality of heat-conducting bodies, each located:
         (a) partly contacting at least one of the permanent magnets, and
         (b) partly inside one of the cooling channels.

14. A wind turbine permanent magnet assembly comprising:
   a plurality of permanent magnets;
   a plurality of axially extending cooling channels, each cooling channel at least partially bounded by at least one of the permanent magnets; and
   a plurality of heat-conducting bodies, each located:
      (a) partly contacting at least one of the permanent magnets, and
      (b) partly inside one of the cooling channels.

15. The wind turbine permanent magnet assembly of claim 14, wherein each heat-conducting body is positioned contacting two of the permanent magnets.

16. The wind turbine permanent magnet assembly of claim 14, wherein two of the permanent magnets are axially aligned and at least one of the heat-conducting bodies is located between said two axially aligned permanent magnets.

17. The wind turbine permanent magnet assembly of claim 14, wherein two of the permanent magnets are radially aligned and at least one of the heat-conducting bodies is positioned contacting said two radially aligned permanent magnets.

18. The wind turbine permanent magnet assembly of claim 14, wherein each of the permanent magnets includes a seat configured to house at least one of the heat-conducting bodies.

19. The wind turbine permanent magnet assembly of claim 14, wherein each of the heat-conducting bodies includes a heat pipe.

20. The wind turbine permanent magnet assembly of claim 14, wherein at least one of the heat-conducting bodies includes cooling fins housed inside one of the cooling channels.

21. The wind turbine permanent magnet assembly of claim 14, wherein the plurality of cooling channels are each at least partially bounded by a plurality of radially spaced rows of the permanent magnets.

22. The wind turbine permanent magnet assembly of claim 14, wherein at least one of the cooling channels is partially bounded by:
   a row of the permanent magnets, and
   two clips configured to support at least one of the permanent magnets.

* * * * *